United States Patent
Shen et al.

(10) Patent No.: US 8,585,126 B1
(45) Date of Patent: Nov. 19, 2013

(54) VEHICLE DRAIN HOLE PLUG

(71) Applicant: Toyota Motor Engineering & Manufacturing North America, Inc., Erlanger, KY (US)

(72) Inventors: Mingher Fred Shen, Ann Arbor, MI (US); Scott W. Shopoff, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/645,901

(22) Filed: Oct. 5, 2012

(51) Int. Cl.
*B60J 9/00* (2006.01)

(52) U.S. Cl.
USPC .......................................................... 296/154

(58) Field of Classification Search
USPC .......................................................... 296/154
See application file for complete search history.

(56) References Cited

U.S. PATENT DOCUMENTS

| 3,158,176 | A | | 11/1964 | Toland | |
|---|---|---|---|---|---|
| 3,382,889 | A | * | 5/1968 | Heinz et al. | 137/855 |
| 3,701,560 | A | | 10/1972 | Emmerson | |
| 6,450,563 | B2 | | 9/2002 | Yee | |
| 6,578,901 | B2 | | 6/2003 | Sommer | |
| 7,621,373 | B2 | * | 11/2009 | Helferty | 181/268 |

* cited by examiner

*Primary Examiner* — Joseph Pape
(74) *Attorney, Agent, or Firm* — Gifford, Krass, Sprinkle, Anderson & Citkowski, P.C.

(57) ABSTRACT

A clip for a vehicle drain hole. The vehicle drain hole is operable to allow liquid to escape from a cavity while simultaneously preventing wind noise or dust particulates from entering the hole. The apparatus includes a first surface and a second surface wherein the first surface includes a first aperture. The apparatus further includes an attachment structure mounted to the second surface wherein the attachment structure is operable to connect to the vehicle drain hole. The attachment structure is spaced apart from the first aperture of the first surface thereby allowing the first surface and the second surface to fully cover the vehicle drain hole. This allows a liquid to escape the vehicle drain hole and preventing or reducing the wind entering the vehicle drain hole thereby preventing noise heard by the user.

7 Claims, 4 Drawing Sheets

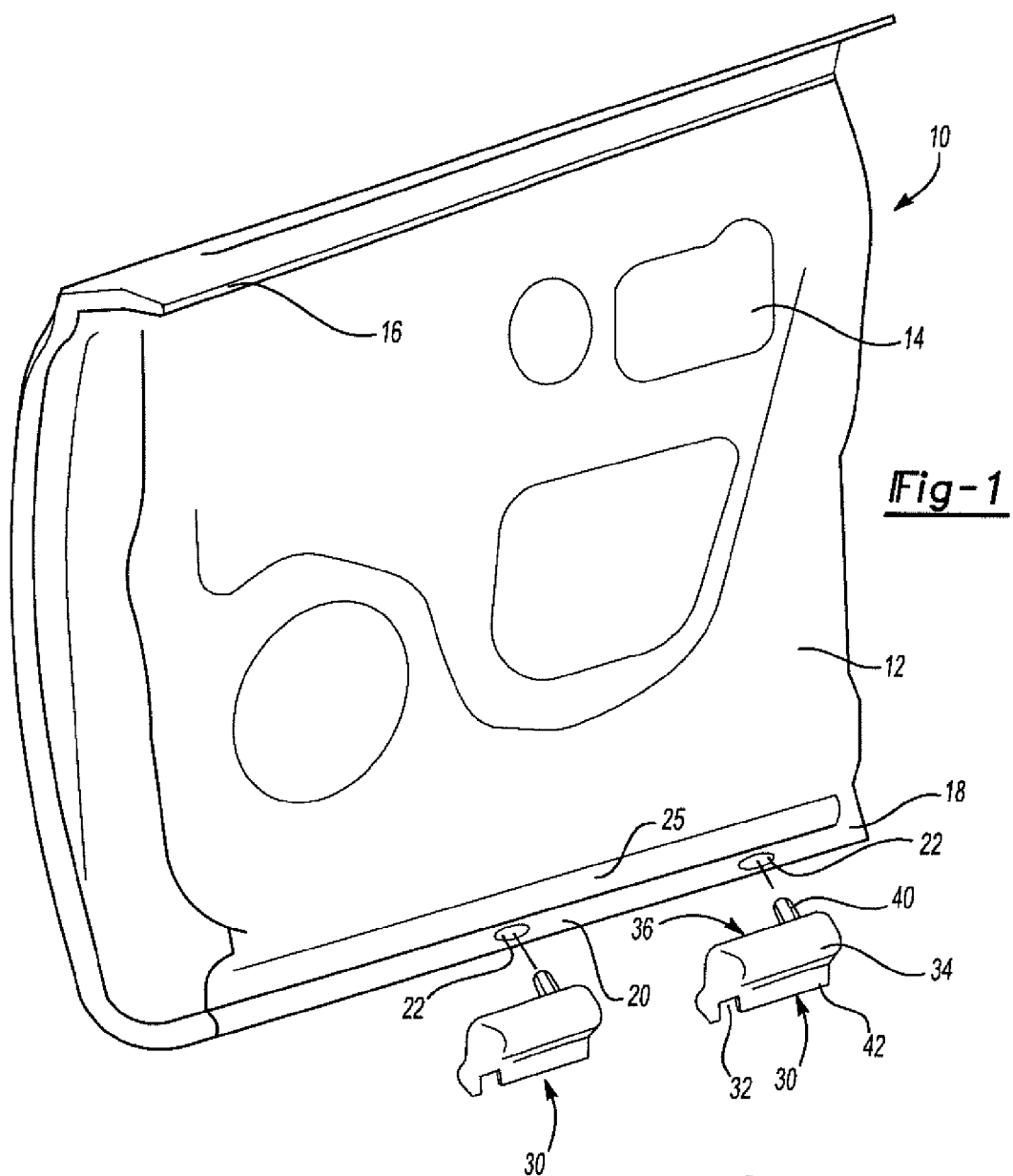
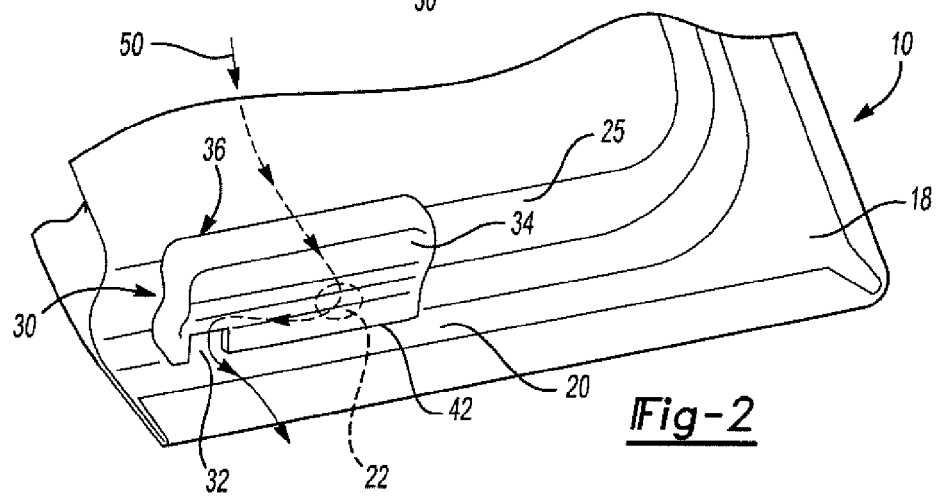

VEHICLE DRAIN HOLE PLUG

FIELD OF THE INVENTION

This invention relates generally to an apparatus for preventing wind noise. More particularly, this invention relates to an apparatus for preventing wind noise on a vehicle door drain hole while still permitting the flow of liquid.

BACKGROUND OF THE INVENTION

It is well known in the art to provide a drain hole cover having a plug to prevent dust intrusion into a vehicle door. Drain holes are common on vehicle doors and other vehicle body panels to permit drainage of liquids used during treatment processes during assembly or to permit drainage of water during vehicle operation. Numerous drain holes are provided on the vehicle door to encourage liquid drainage. These drainage apertures are required to be large enough to facilitate quick liquid drainage from the vehicle door.

Typical apertures are in the dimension sizing of 7 mm by 14 mm (4 mm after size reduction), but vary depending on vehicle requirements and drainage requirements. The large size of the aperture encourages dust and other particulate matter to enter the aperture and rest within the vehicle door. Dust preventers or covers as shown in FIG. 9 illustrating the prior art are well known and commonly used. However, covers similar to those as shown in FIG. 9 of the prior art do not prevent or reduce wind noise created when the vehicle is in operation. Wind commonly flows over or around the aperture, which is still exposed in the prior art, and creates a loud noise which is heard by the user. Accordingly, there exists a need in the art to provide a cover or plug which permits the drainage of liquid while simultaneously preventing or reducing wind noise and dust from entering the drainage aperture.

SUMMARY OF THE INVENTION

The present invention provides for a clip for a vehicle drain hole. The vehicle drain hole is operable to allow liquid to escape from a cavity while simultaneously preventing wind noise or dust particulates from entering the hole. The apparatus includes a first surface and a second surface wherein the first surface includes a first aperture. The apparatus further includes an attachment structure mounted to the second surface wherein the attachment structure is operable to connect to the vehicle drain hole. The attachment structure is spaced apart from the first aperture of the first surface thereby allowing the first surface and the second surface to fully cover the vehicle drain hole without blocking the vehicle drain hole thereby allowing a liquid to escape the vehicle drain hole and preventing or reducing the wind entering the vehicle drain hole thereby preventing noise heard by the user.

BRIEF DESCRIPTION OF THE DRAWINGS

FIG. 1 illustrates an exploded perspective view of the clips and a vehicle door;

FIG. 2 illustrates a perspective view of an installed clip on a vehicle door;

DETAILED DESCRIPTION OF THE INVENTION

Figure 3:
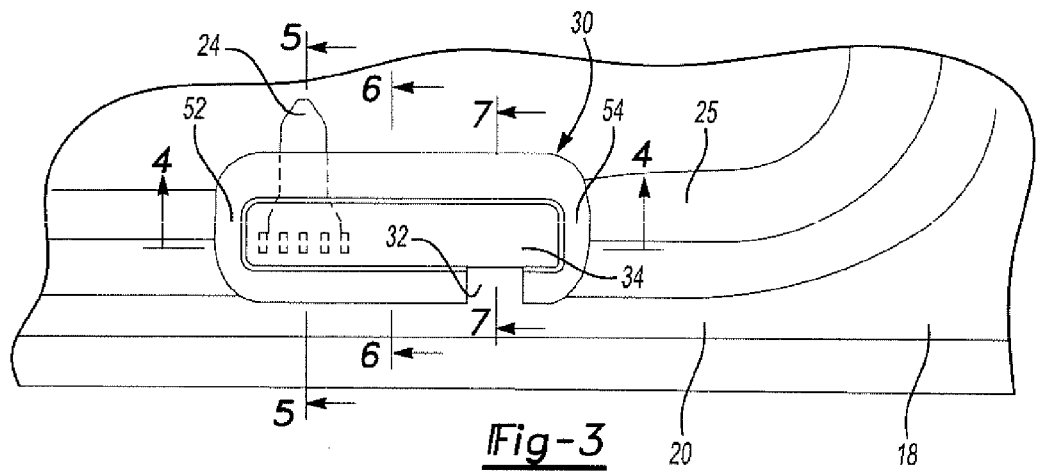
FIG. 3 illustrates a front view of a clip mounted on a vehicle door.

The figures illustrate a clip or plug operable to allow drainage of a liquid from a vehicle body panel while simultaneously preventing the entrance of wind or debris thereby creating noise or dust into a vehicle drain hole. The clip includes a first surface having an aperture spaced apart from a clip operable to connect to a vehicle drain hole. The displacement and off set placement of the aperture and the vehicle drain hole reduces and nearly prevents the wind noise created from vehicle operation from entering the vehicle drain hole.

FIG. 1 illustrates a vehicle door 10 having an inner surface 12 and a plurality of structural elements 14. The vehicle door 10 further includes an upper end 16 and a lower end 18. The lower end 18 includes a first lower surface 20 and a second lower surface 25. The lower surfaces 20, 25 include a plurality of drain holes 22 to permit liquid or water to escape from the vehicle door 10.

A clip 30 is provided having a first surface 34. The first surface 34 includes a first aperture 32. The clip 30 includes a lower edge 42. The aperture 32 is provided and connected to the lower edge 42. The lower edge 42 and the aperture 32 are large enough to permit the escape of liquid from the vehicle drain hole 22. The clip 30 further includes a second back surface 36. The back surface 36 includes a clip 40. The clip 40 is operable to connect to the vehicle drain hole 22.

FIG. 2 illustrates a perspective view of the clip 30 in an installed position on the vehicle door 10. Water or other liquid 50 flows out of the drain hole 22 through an inner cavity of the clip 30 and out the aperture 32 of the clip 30. The displacement of the drain hole 22 and attachment structure 24 from the aperture 32 permits the flow of liquid 50 out of the drain hole 22, into the inner cavity of the clip 30, and out of the aperture 32 of the clip. The displacement of the aperture 32 and the vehicle drain hole 22 creates a labyrinth thereby greatly reducing or preventing air and dust from entering the drain hole 22. Although wind or dust may enter the aperture 32 of the clip 30, wind or dust rarely reaches the drain hole 22. The aperture 32 and the drain hole 22 are separated by a predetermined distance. The predetermined distance varies between 10 mm and 100 mm depending on the requirements of the vehicle and the user.

Figure 4:
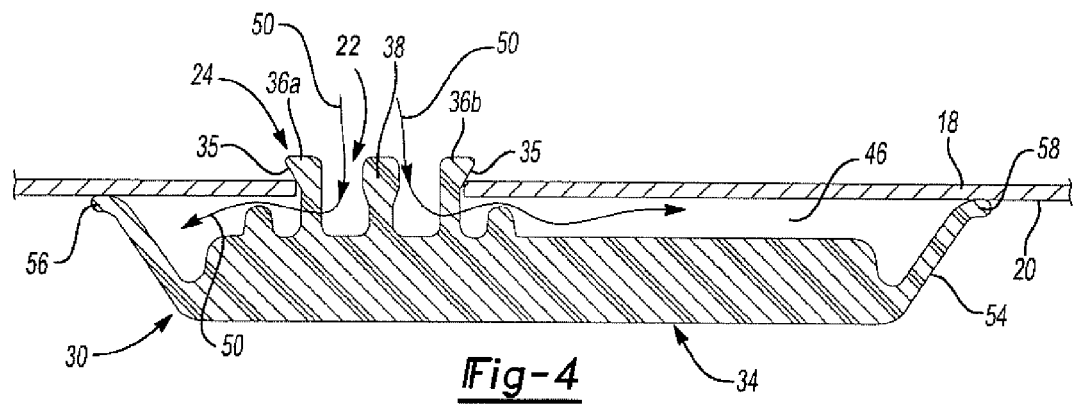
FIG. 4 illustrates a cross-sectional view of the clip along the line 4-4.

FIG. 4 illustrates a cross-sectional view along the line 4-4 as shown in FIG. 3. The clip 30 is shown having an upper outer surface 34. The first surface 34 is generally planar. The upper outer surface 34 extends to planar end portion 52, 54. The end portions 52, 54 are angled to meet end portions 56, 58 which connect to the vehicle surfaces 20, 25. FIG. 4 illustrates a cavity 46 created by the clip 30.

Figure 8:
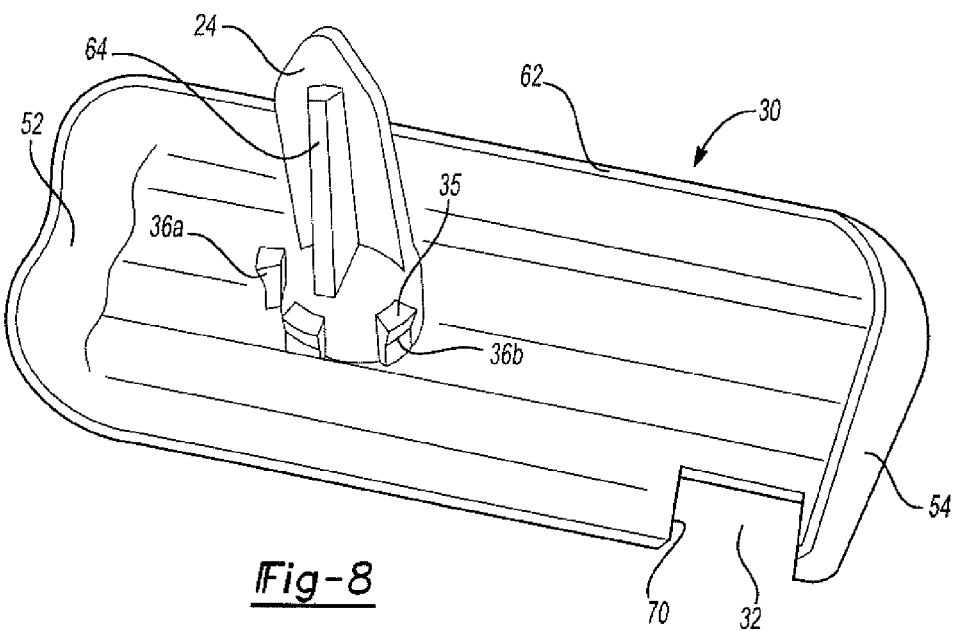
FIG. 8 illustrates a perspective view of the clip from the rear view.
Figure 7:
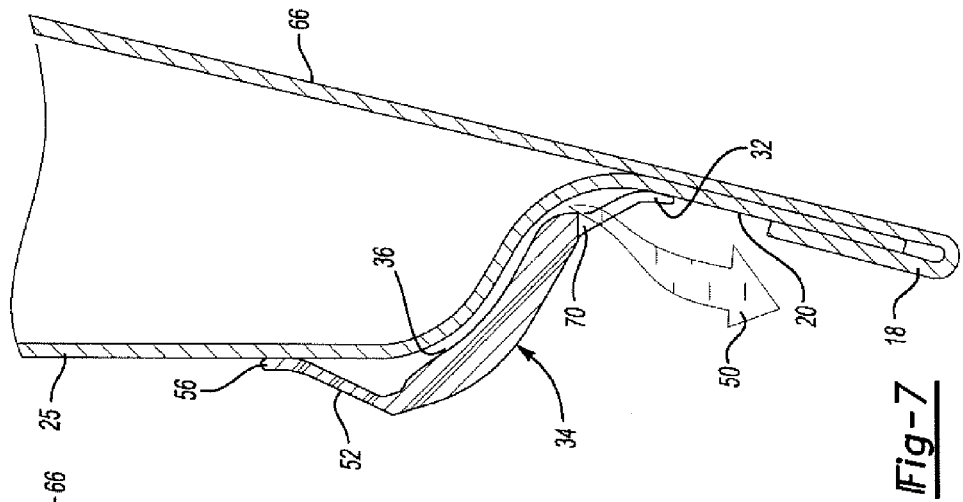
FIG. 7 illustrates a cross-sectional view of the clip along the section 7-7.
Figure 6:
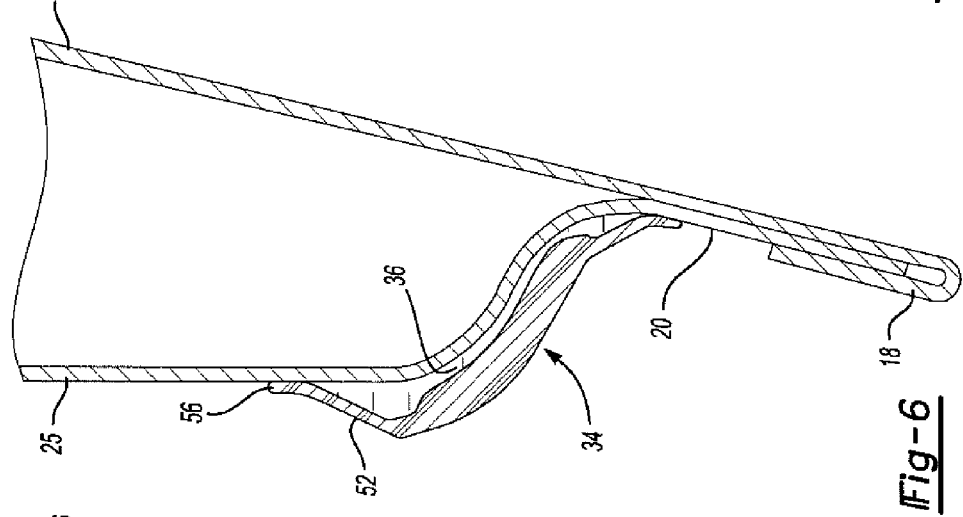
FIG. 6 illustrates a cross-sectional view of the clip along the line 6-6.
Figure 5:
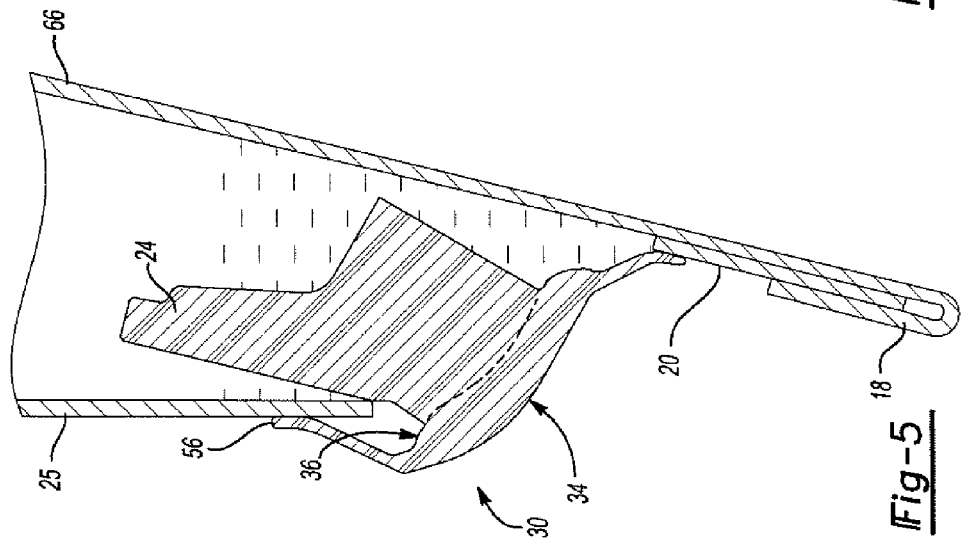
FIG. 5 illustrates a cross-sectional view of the clip and vehicle door panel along the line 5-5.

FIGS. 5-7 illustrate various cross sections of the clip 30. FIG. 5 illustrates a cross section along the line 5-5 as shown in FIG. 3. The attachment structure 24 is provided mounted to the second or rear surface 36 of the clip 30. As shown in FIG. 4, the attachment structure 24 includes a plurality of attachment structures 36a, 36b, 38. The various attachment structures of the attachment structure 24 are generally snap fit bosses operable to securely connect to the aperture 22. The attachment structures 24, 36a, 36b, 38 include a plurality of snap fit portions 35 allowing the attachment structure 24 to better secure to the aperture 22. These various attachment and support structures 24, 36a, 36b, 38, 64 are also shown in FIG. 8. FIG. 8 illustrates a rear side view of the clip 30 wherein the aperture 32 includes a side wall 70. The rear side as shown in FIG. 8 of the clip 30 further includes a lower lip portion 62 operable to mount flush with a surface 20, 25 of the vehicle door 10.

FIG. 6 illustrates a cross-sectional view of the clip 30 along line 6-6 as shown in FIG. 3. This portion of the clip allows liquid 50 to flow through the cavity 36 from the drain hole 22 to the aperture 32. FIG. 6 further illustrates a secondary vehicle body panel 66. FIG. 7 illustrates a cross-sectional view along the line 7-7 as shown in FIG. 3. FIG. 7 illustrates a cross-sectional view of where the aperture 32 is located. Water or other liquid 50 is allowed and permitted to flow through the cavity 36 created by the clip 30 and out through the aperture 32.

FIG. 7 illustrates side wall 70 as seen and created by the aperture 32 of the clip 30. The clip 30 includes a first surface 34. The outer surface 34 may be planar or contoured to match the shape of the various vehicle body panels or the vehicle door 10.

Figure 9:
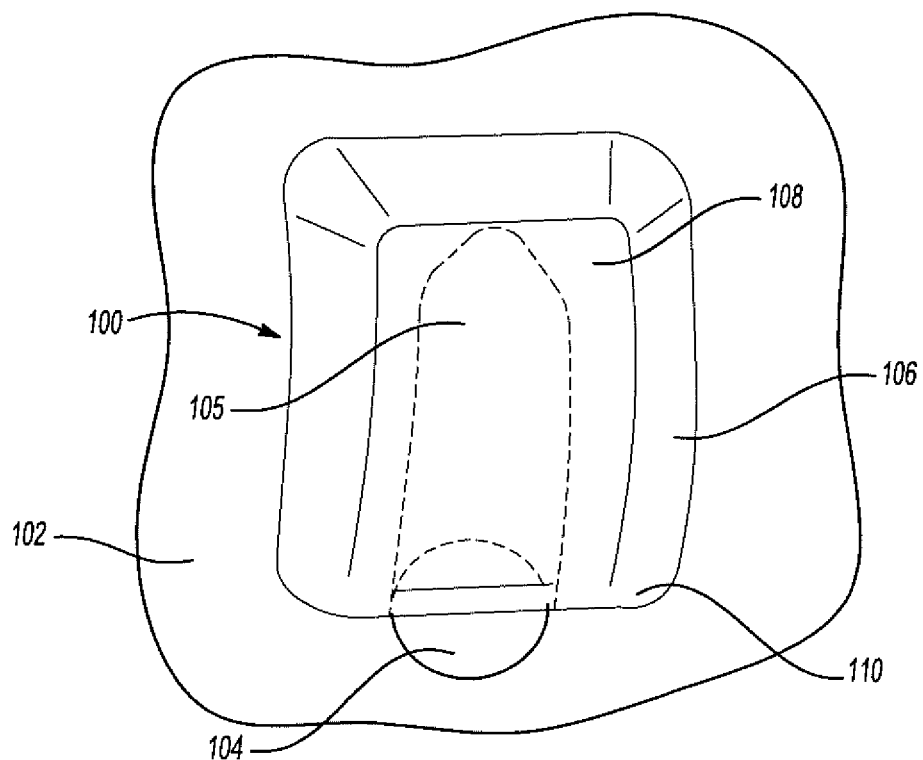
FIG. 9 illustrates a clip of the prior art.

FIG. 9 illustrates a clip 100 of the prior art. FIG. 9 illustrates an aperture 105 covered by the clip 100. The clip 100 includes an upper surface 108 and various side walls 106. The side walls 106 connect to one another by a rounded means as illustrated by 110. The clip 100 is mounted to the vehicle drain hole 105 by a snap fit plug. The clip 100 is mounted to the plug and onto the first vehicle body panel surface 102. The prior art as illustrated in FIG. 9 illustrates an exposed portion 104 of the vehicle drain hole 105. As wind or dust is exposed to the exposed portion 104 of the vehicle drain hole 105, it is permitted to enter the vehicle drain hole 105 through the exposed portion 104. As wind flows over, around and into the exposed portion 104, a significant noise is heard by the vehicle user. It is an advantage of the present invention as described above to prevent or reduce the wind noise as created in the prior art.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the appended claims.

The invention claimed is:

1. An assembly for a vehicle having a drain hole, the vehicle drain hole operable to allow liquid to escape from a cavity, the assembly comprising:
   a vehicle body portion having an outer surface, the outer surface having the drain hole permitting communication between an area behind the vehicle body portion and an external environment; and
   a clip having a first surface and a second surface, the first surface having a first aperture, an attachment structure mounted to the second surface, the attachment structure spaced apart from the first aperture of the clip, the attachment structure extending through and secured to the drain hole, the second surface forms a cavity between the second surface and the outer surface of the vehicle body portion to permit liquid to escape the vehicle drain hole and flow out through the first aperture of the clip, the assembly thereby allowing the first surface and the second surface to fully cover without blocking the vehicle drain hole wherein liquid is permitted to escape the vehicle drain hole and wind is not permitted to enter the vehicle drain hole.

2. The assembly of claim 1 wherein the first surface is generally planar.

3. The assembly of claim 1 wherein the second surface is generally planar.

4. The assembly of claim 1 wherein the attachment structure is a snap fit boss.

5. The assembly of claim 1 wherein the vehicle drain hole is provided for on a vehicle door.

6. The assembly of claim 1 wherein the vehicle drain hole on the vehicle door is provided for on a lower portion of the vehicle door.

7. The assembly of claim 1 wherein the attachment structure does not block liquid drainage.

\* \* \* \* \*